United States Patent [19]

Didier et al.

[11] Patent Number: 4,607,408

[45] Date of Patent: Aug. 26, 1986

[54] METHOD FOR DETERMINING A MOMENT OF INERTIA OF CLOTHES IN A WASHING AND/OR DRYING MACHINE

[75] Inventors: Laurent Didier, La Roche sur Yon; Jean C. Geay, St. Florent des Bois, both of France

[73] Assignee: Es swein S.A., Courheaoie, France

[21] Appl. No.: 663,695

[22] Filed: Oct. 22, 1984

[30] Foreign Application Priority Data

Oct. 25, 1983 [FR] France .................................. 83 16997

[51] Int. Cl.⁴ ............................................ D06F 33/02
[52] U.S. Cl. ...................................... 8/159; 68/12 R
[58] Field of Search ..................... 8/158, 159; 68/12 R

[56] References Cited

U.S. PATENT DOCUMENTS

| | | | |
|---|---|---|---|
| 1,449,458 | 3/1923 | Sutermeister | 73/59 X |
| 3,818,754 | 6/1974 | Asmus . | |
| 4,235,085 | 11/1980 | Torita | 68/12 R |
| 4,400,838 | 8/1983 | Steers et al. | 68/12 R X |
| 4,411,143 | 10/1983 | Scholl et al. | 68/12 R |

FOREIGN PATENT DOCUMENTS

| | | |
|---|---|---|
| 0090716 | 3/1983 | European Pat. Off. . |
| 132366 | 10/1979 | Japan ............................. 68/12 R |
| 04058 | 11/1983 | Japan ............................. 68/12 R |

2063927 6/1981 United Kingdom .

Primary Examiner—Philip R. Coe
Attorney, Agent, or Firm—Cushman, Darby & Cushman

[57] ABSTRACT

A process for determining the load of clothes in a rotating drum includes determining the moment of inertia of the mass of clothes in the drum, which is the image of the load of clothes, from data relating to the drive torque of the drum, the friction torque of the drum, the moment of inertia of this drum and the acceleration of the drum.

The drum washing and/or drying machine for clothes comprises, for implementing this process, at least one means collecting the data relating to the acceleration of the drum, a means collecting the data relating to the drive torque of this drum and a microprogram system programmer providing, in accordance with a pre-established procedure, determination of an optimum operating program as a function of the load of clothes in the drum represented by the moment of inertia of the mass of clothes in this drum which is the image of the load of clothes and which is determined from said data, thus acquired, concerning the drive torque of the drum and acceleration of the drum and data indicated or stored concerning the friction torque and the moment of inertia of this drum.

7 Claims, 5 Drawing Figures

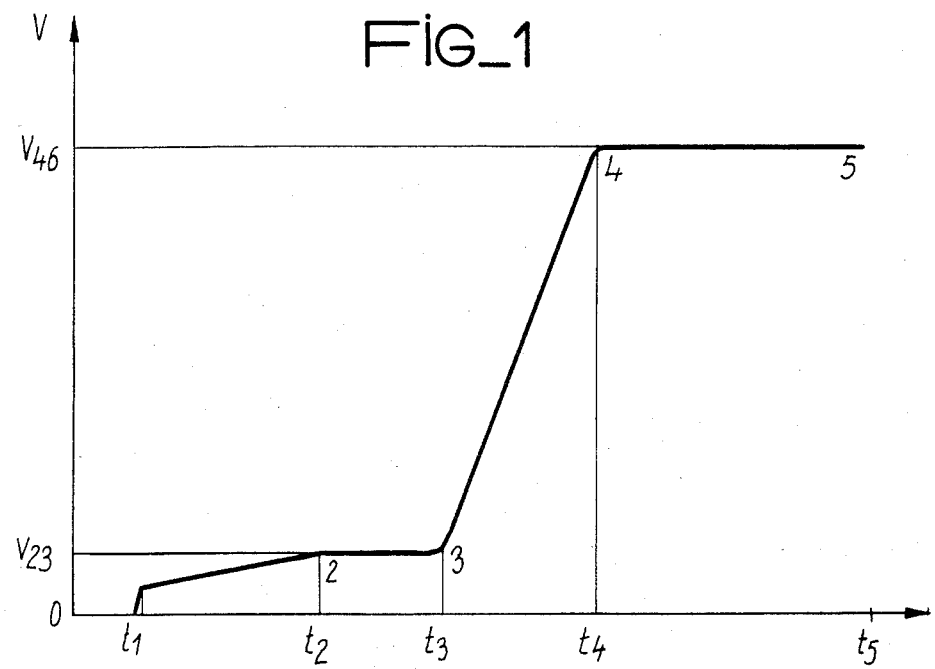
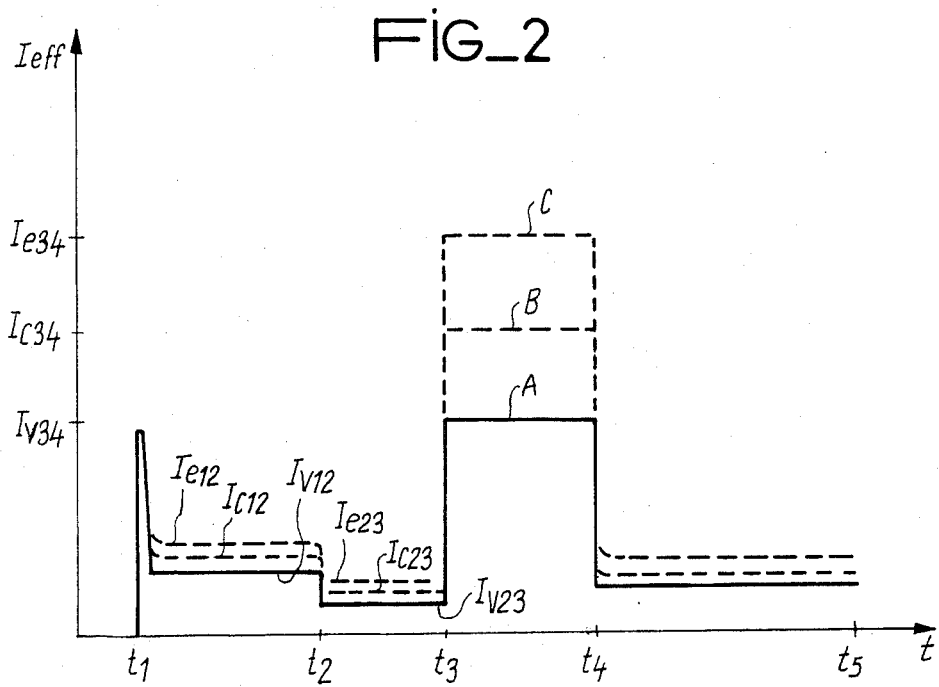

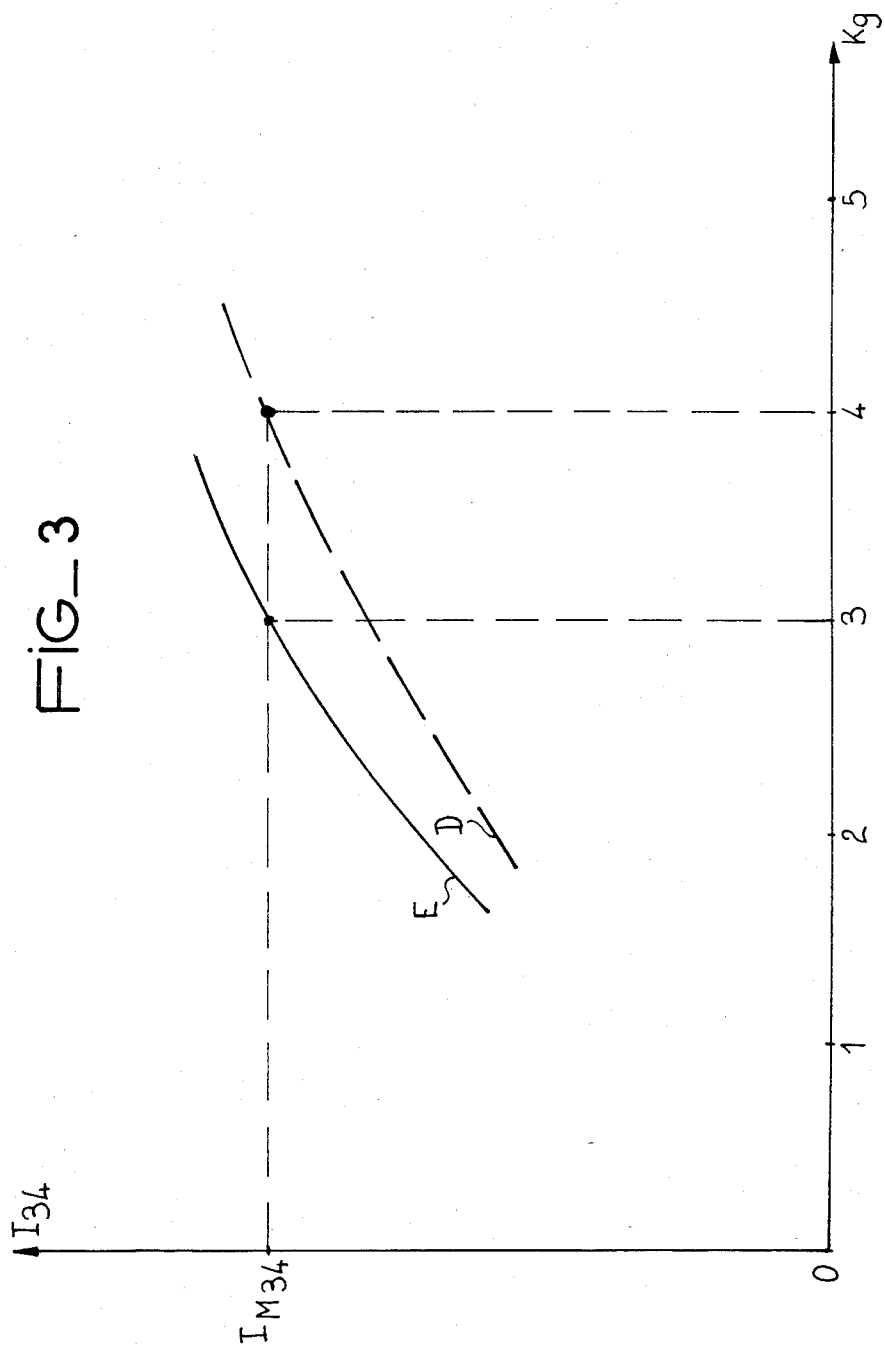

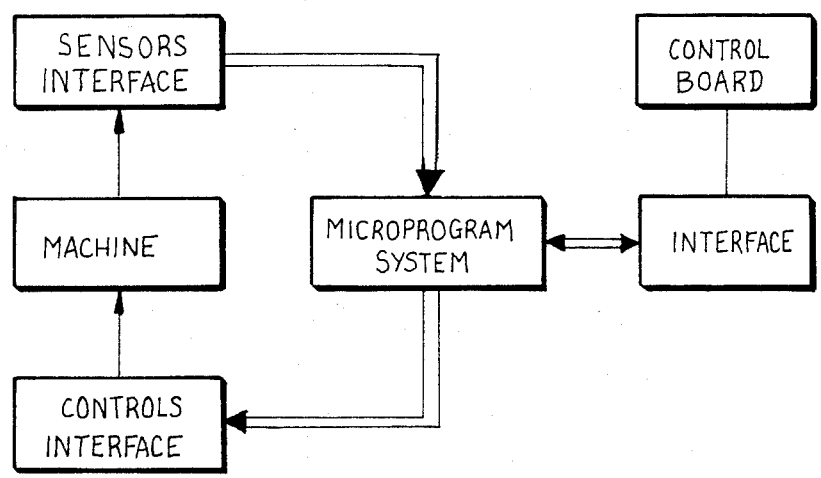
FIG_4
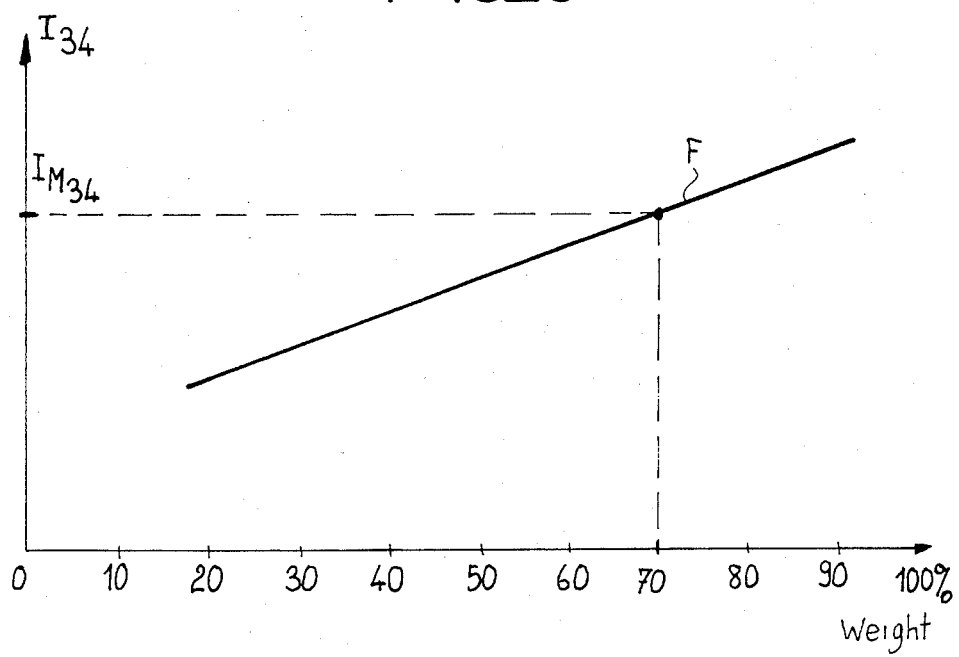
FIG_5

METHOD FOR DETERMINING A MOMENT OF INERTIA OF CLOTHES IN A WASHING AND/OR DRYING MACHINE

BACKGROUND OF THE INVENTION

1. Field of the Invention

The present invention relates to a process for determining a load of clothes or material in a rotary drum and a washing and/or drying machine using this process.

2. Description of the Prior Art

Up to present clothes washing and/or drying machines have known different steps in the automatic operation thereof First of all, they were semi-automatic, then automatic with an electro-mechanical programmer with which a choice of program may be made among a limited number of predetermined programs, finally automatic with optimum operating program determined by programming a device such as a microprocessor from data supplied by the user concerning the clothes, such as the weight or the mass of clothes, the type of clothes, the degree of dirtiness, the temperature etc . . . . The constraints imposed on the user in controlling the machines have proved numerous. Frequently, since he does not have a weighing means available, the user indicates to these machines an approximative weight of clothes which sometimes diverges greatly from its real weight. Inexact data input into the machines greatly compromises the result to be expected from an optimum program for operation thereof since, for a mass of a given type of clothes and a given degree of dirtiness, optimum washing or rinsing of the clothes normally requires at least a predetermined amount of water for each bath, a pre-established temperature of the washing bath, previously chosen energy for agitation, a scheduled intensity of rinsing (number of baths), a preselected intensity of spin drying (spin drying time and speed). Optimal drying of the clothes usually requires a selected drying temperature and a predetermined duration of this operation.

In a washing and/or drying machine, the clothes mass data associated with that of the type of clothes (cotton material, towelling, synthetic material etc . . . ) leads to a well known clothes load data. This clothes load data corresponds as a whole to the percentage of the volume of the drum occupied by the clothes during operation of the machine. Knowledge of this clothes load data is indispensable for correct determination of the parameters recalled above concerning operation of the machine, in particular of the water levels required for each bath for washing or rinsing this clothes load. The higher this load of clothes, the higher the level of water in the tank of the machine required for washing and rinsing it or the longer the drying period.

To obtain good washing and/or drying results, the user must necessarily give precise indications to the machine.

SUMMARY OF THE INVENTION

The present invention, with the purpose of reducing the constraints imposed on the user in controlling a clothes washing and/or drying machine and avoiding the above disadvantages, provides a process for determining a load of clothes in a rotary drum.

The invention provides an automatic and economic washing and/or drying machine which determines by its own means the clothes load condition, the amount or level of water corresponding to this load of clothes for each washing and rinsing bath and the other elements of an optimum washing program as a function of the washing temperature and possibly of the degree of dirtiness indicated by the user and in the optimum program for drying the clothes, the drying time depending on the drying temperature and on the degree of humidity of the clothes at the end of drying indicated by the user.

According to the invention, the process for determining the load of clothes in a rotary drum includes determining the moment of inertia of the mass of clothes in the drum, from data concerning the motor torque or drive torque, the acceleration of the drum, the friction torque and the moment of inertia of this drum.

BRIEF DESCRIPTION OF THE DRAWINGS

For a better understanding of the invention, a number of embodiments are described hereafter illustrated by the accompanying drawings in which:

FIG. 1 represents a diagram of a speed sequence as a function of time imposed on the drum of a washing and/or drying machine in accordance with the invention, for determining the load of clothes in this drum, FIG. 2 shows curves of effective currents, as a function of time, supplied to a universal motor driving the drum of the machine during the speed sequence, illustrated in FIG. 1, imposed on this drum, FIG. 3 shows two curves of currents, as a function of the mass of clothes of two types, supplied to the universal motor driving the drum of the machine during the speed up phase, with high constant acceleration, of this drum in the speed sequence illustrated in FIG. 1, FIG. 4 is a simplified diagram of a programmer of the machine whose drum is subjected to a speed sequence of FIG. 1, and FIG. 5 is a clothes load curve as a function of the current absorbed by the motor of FIG. 3.

DESCRIPTION OF THE PREFERRED EMBODIMENTS

In accordance with the invention, the process for determining a mass of clothes in a rotating drum is applicable to a clothes washing machine, to a clothes drying machine or to a clothes washing and drying machine.

This process for determining a load of clothes in a rotating drum includes the steps of determining the moment of inertia of the mass of clothes in the drum, which is the image of the load of clothes, from data related to the motor torque or drive torque of the drum, the acceleration of the drum, the friction torque and.the moment of inertia of this drum.

According to this process, the clothes introduced into the drum are dry clothes or clothes in their condition at the end of spin drying.

This process comprises the following steps:

rotating the drum which is loaded with dry clothes or clothes after dry spinning, according to a speed sequence comprising a constant low speed of rotation phase, a high constant speed of rotation phase and a speed-up phase between this low constant speed of rotation and said high constant speed of rotation, recording during each of the phases of this rotational speed sequence at least one value of the acceleration of the drum and a value of the corresponding motor torque or drive torque of this drum, determining the moment of inertia of the mass of clothes in the drum, which is the image of the load of clothes from these recorded values of the predetermined value of the moment of inertia of the rotating drum, and from the value of the friction torque of the rotating drum in the speed up phase, approximately estimated to an arithmetic average of the friction torques in the constant low speed and constant high speed phases.

These data have therebetween a known relationship of equality which is in the following form:

$$C_e = (L + J_o)\frac{dw}{dt} + C_f$$

in which
$C_e$ is the drive torque of the drum
$C_f$ is the friction torque of the drum
L is the moment of inertia of the mass of clothes
$J_o$ is the moment of inertia of the rotating drum, and
w is the speed of rotation of the drum
dw/dt is the acceleration.

It will be noted that in the constant low drum rotational speed and constant high rotational drum speed phases, the acceleration dw/dt is zero, and the values of the recorded drive torque of the drum are equal to those of the friction torque of this drum. The friction torque of the rotating drum ($C_{fa}$) in the speed-up phase of the drum between the constant low speed and the constant high speed of this drum is, in accordance with the invention, estimated approximately at an arithmetic average of the friction torques of the drum in these constant low speed ($C_{fb}$) and constant high speed ($C_{fh}$) phases:

$$C_{fa} = \frac{C_{fb} + C_{fh}}{2}$$

The moment of inertia L of the mass of clothes, in the above relationship of equality may then be in the following form:

$$L = \frac{1}{\frac{dw}{dt}}\left(C_e - J_o\frac{dw}{dt} - C_{fa}\right)$$

Tests have been made in the same washing machine with an identical mass of clothes of several types such as cotton material, towelling, synthetic material, linen. It was discovered that the moment of inertia L of a towelling is greater than the moment of inertia of cotton material whereas the moment of inertia L of a synthetic material is substantially equivalent to that of cotton material. It was also discovered that, during operation of the machine, the volume occupied in the drum by this mass of towelling is greater than that occupied by an identical mass of cotton material or synthetic material. The moment of inertia L of a mass of clothes of a given type of clothes thus reflects the corresponding load image of clothes of this type, which, as was pointed out in a paragraph above, corresponds to the percentage of volume of the drum occupied by these clothes during operation of the machine.

According to the process of the invention, the data concerning the moment of inertia of a mass of clothes of a given type which is the corresponding clothes load image forms a basis for determining certain operating parameters of the machine already recalled in a preceeding paragraph.

In a first example of implementing the above process, a washing and/or drying machine comprising, for its automatic operation, a microprogram system programmer of a known type schematically illustrated in FIG. 4, is provided with a means for detecting the data relating to acceleration of the drum, formed by an accelerometer or a tachometric generating system of a known type, and a means for detecting the data relating to the motor torque or drive torque of this drum which is also a sensor of known type.

The data values which are already known or may be previously determined, which are in the above relationship of equality such as the moment of inertia of the drum $J_o$, the friction torque of the drum $C_{fa}$ etc . . . are previously recorded or stored by the programmer.

In controlling this washing and/or drying machine, the user only indicates to the machine the temperature, possibly the degree of dirtiness and/or the degree of humidity of the clothes at the end of drying whereas the machine, by its own means, determines from the above data detected and recorded or stored, the moment of inertia of the mass of clothes introduced into the machine. Consequently, the load of clothes of which this moment of inertia is the image is found, and an optimum operating program with the amount or level of water corresponding to this load of clothes for each washing and rinsing bath and the other elements of the program is used, thus eliminating the risk of an inaccurate indication of the mass or weight of clothes, usually committed by the user. The invention thus contributes to reducing the constraints imposed on the user and to improving the results expected from the machine.

In a variant, the process for determing the load of clothes in a rotating drum comprises the following steps:

rotating the drum loaded with dry clothes or clothes at the end of dry spinning following a sequence of speeds as a function of time, illustrated in FIG. 1, comprising by way of example a slow speed rise phase between 0 and 100 rpm so as to cause the clothes to be well distributed inside the drum, a constant low speed phase of a 100 rpm for stabilizing packing of the clothes against the wall of the drum, a constant high acceleration speed rise phase between 100 rpm and 500 to 800 rpm and a high constant speed phase of 500 to 800 rpm, by means of an electric motor whose drive torque is substantially proportional to the current supplied to this motor, or forms a closely connected function of the current supplied to this motor, recording in each of the phases of this rotational speed sequence of the drum, the data concerning the current supplied to the motor driving this drum and the data concerning the acceleration of the drum, determining the moment of inertia of the mass of clothes in the rotating drum which is the image of the load of clothes from these recorded data, from the predetermined moment of inertia of the empty drum and from the value of the friction torque of the drum rotating in the high acceleration speed rise phase, estimated approximately at an arithmetic average of the friction torques in the constant low speed and constant high speed phases of rotation of the drum. The above data have therebetween a known equality relationship as follows:

$$C_m = (L + J_o)\frac{dw}{dt} + C_f$$

in which $C_m$ is the motor drive torque of the drum
$C_f$ is the friction torque of the drum
L is the moment of inertia of the rotating mass of clothes
$J_o$ is the moment of inertia of the rotating drum
w is the speed of rotation of the drum
dw/dt is the acceleration.

It should be noted that in the constant low speed and constant high speed phases of drum rotation, the acceleration (dw/dt) is zero and the values of the drive torque ($C_m$) are equal to those of the friction torque of this drum.

In the high acceleration speed-up phase between the constant low speed phase and the constant high speed phase of drum rotation, the acceleration is constant.

The friction torque of the rotating drum in the high acceleration speed up phase ($C_{fa}$) is estimated approximately in accordance with the invention at an arithmetic average of the friction torques of the drum in the constant low speed ($C_{fb}$) and constant high speed ($C_{fh}$) phases:

$$C_{fa} = \frac{C_{fb} + C_{fh}}{2}$$

The moment of inertia L of the mass of clothes, in the above relationship of equality, may then be in the following form:

$$L = \frac{1}{\frac{dw}{dt}}\left(C_m - J_o\frac{dw}{dt} - C_{fa}\right)$$

This value of L represents the image of the load of clothes.

In a second example using this variant of the process, a washing and/or drying machine having, for automatic operation thereof, a microprogram system programmer of a known type shown schematically in FIG. 4 is provided, as electric motor driving the drum, with a known universal motor whose drive torque ($C_m$) is substantially proportional to the current supplied to this motor, or forms a closely connected function of this current.

$$C_m = K(I - I_o)$$

in which K and $I_o$ are constants dependent on the structure of this motor and I is the current supplied to this motor. This washing and/or drying machine is further provided with a speed regulator of known type giving, in the high acceleration speed-up phase, a definite speed reference for this motor which is a linear function of time and, consequently, a constant given acceleration and a means for detecting the data of the current supplied to this universal motor. When a speed sequence such as the curve illustrated in FIG. 1 is imposed on the drum of the machine, the sensor detecting the data of the current supplied to the universal motor acquires data of the current for tracing a curve of the current as a function of time (FIG. 2). In FIG. 2 there are shown three superimposed curves A, B, C of the current supplied to the universal motor. Curve A ($I_v$ as a function of time) represents the case where the drum of the machine is empty. Curve B ($I_c$ as a function of time) represents the case where the drum is loaded with a mass M of cotton material or synthetic material and curve C ($I_e$ as a function of time) represents the case where the drum is loaded with the same mass M of towelling material.

In the speed sequence illustrated in FIG. 1 between times $t_1$ and $t_2$ there is a slow speed-up of the drum so as to spread out the clothes evenly inside this drum. This slow rise in speed corresponds to the current supplied to the motor $I_{12}$ between times $t_1$ and $t_2$ in the curve of FIG. 2. $I_{12}$ corresponds to the friction and to the acceleration during the rising speed between start up and speed $V_2$ of the drum. $I_{23}$ between times $t_2$ and $t_3$ corresponds solely to the friction since the speed of the drum is constant during this period of time ($V_2 = V_3$) and acceleration is zero. $I_{34}$ between $t_3$ and $t_4$ corresponds to the friction and to the high constant acceleration during speed up of the drum. $I_{45}$ between $t_4$ and $t_5$ corresponds solely to the friction.

It is clear from the foregoing that between $t_2$ and $t_3$ the drive torque $C_m$ is equal to the friction torque:

$$C_m = C_{fb} = C_{f23}$$

Between $t_4$ and $t_5$ the drive torque $C_m$ is also equal to the friction torque.

$$C_m = C_{fh} = C_{f45}$$

Between $t_3$ and $t_4$ the friction torque during this high acceleration speed-up phase is estimated according to the invention at $$C_{fa} = C_{f34} = \frac{C_{f23} + C_{f45}}{2}$$

Between $t_3$ and $t_4$, the drive torque is then equal to $$C_m = K(I_{34} - I_o) = (L + J_o)\frac{dw}{dt} + C_{f34}$$

The moment of inertia L of the mass of clothes is in the form:

$$L = \frac{KI_{34}}{\frac{dw}{dt}} - \frac{KI_o}{\frac{dw}{dt}} - \frac{C_{f34}}{\frac{dw}{dt}} - J_o$$

This moment of inertia L is proportional to $I_{34}$ and the value of the current $I_{34}$ supplied to the universal motor in this constant high acceleration speed rise phase, between $t_3$ and $t_4$, reflects the image of this moment of inertia of the rotating mass of clothes, and consequently the image of this load of clothes itself.

In a test, for a similar cotton or synthetic material, the drum of the machine was loaded each time with a larger weight of material and each time a speed sequence illustrated in FIG. 1 was imposed on this drum and a curve D was plotted (in FIG. 3) of the current $I_{34}$ supplied to the universal motor as a function of the mass of cotton or synthetic material introduced into the drum.

In another test for a similar towelling material, the drum of the machine was each time loaded with a larger weight of material and each time a speed sequence illustrated in FIG. 1 was imposed on this drum and on the same coordinate axes of FIG. 3 a curve E was plotted of the current $I_{34}$ supplied to the universal motor as a function of the motor of the mass of towelling material introduced into the drum. It will be noted that curves D and E do not merge and that two masses of material of different types correspond to each value of current $I_{34}$. The value $I_{M34}$ of FIG. 3 for example corresponds to a mass of three kilograms of towelling material and to a mass of four kilograms of cotton or synthetic material.

In a preceeding paragraph, tests were mentioned and it was discovered during these tests that a given mass of towelling material corresponds to a greater load of material than that relating to an identical mass of cotton material or synthetic material.

In FIG. 3 the same value $I_{34}$ corresponds to two masses of material of different types. This is not a disadvantage since $I_{34}$ is an excellent data which characterizes the load of material. $I_{34}$ is the image of the moment of inertia L and the load of material. This confirms the findings in the proceeding tests that the moment of inertia L is the image of the load of clothes. In fact, there is a proportionality between the current $I_{34}$ absorbed by the motor and the load of clothes. In FIG. 5 is shown a correspondance between $I_{34}$ and the load of clothes in the drum. Curve F represents $I_{34}$ as a function of the load of clothes in the drum. $I_{M34}$ corresponds to about 70% of the load of clothes of the drum.

In the machine constructed in accordance with the invention, $I_{M34}$ constitutes a basic data for determining the level of water for example required for washing and rinsing the clothes among other operating parameters of the machine.

In the case of a drying machine, $I_{34}$ is also an excellent data for determining the optimum drying time, for, in order to obtain the same degree of humidity at the end of drying, a towelling material requires a relatively longer drying time than a cotton or synthetic material.

The process for determining a load of clothes in a rotating drum and the washing and/or drying machine using this process described above thus allows better and surprising washing and/or drying results to be obtained than that reached by many known washing and/or drying machines and even those in which an exact weight of clothes is indicated by the user. Furthermore, in the above described washing and/or drying machine, the constraints imposed on the user in controlling the machine are reduced to the minimum i.e. to a simple indication of temperature and the degree of dirtiness, without compromising the efficiency of the machine in determining an optimum operating program.

What is claimed is:

1. A process for determining the load of clothes in a rotating drum of one of: (a) a clothes washing and (b) a clothes drying machine, comprising the steps of:
   rotating said drum; and
   determining the moment of inertia of said clothes in said rotating drum thereby obtaining loading data on said load of clothes.

2. The process as claimed in claim 1 comprising the further steps of;
   rotating said drum at a constant acceleration, and
   determining the moment of inertia of said clothes in the drum from the value of the torque of the rotating drum.

3. The process as claimed in claim 2 further comprising the steps of:
   rotating the drum loaded with clothes using a motor; and
   determining the torque of the rotating drum from the value of the electric current supplied to said motor.

4. The process as claimed in claim 1 further comprising the steps of:
   determining values representing torque of the drum, the acceleration of the drum, the friction torque and the moment of inertia of said drum and
   determining the moment of inertia of said clothes according to a predetermined formula using said values.

5. A process for determining the load of clothes in a rotating drum of one of: (a) a clothes washing and (b) a clothes drying machine, comprising the steps of:
   rotating the drum loaded with dry clothes according to a speed sequence comprising a constant low rotation speed phase, a constant high speed rotation phase and a speed-up phase between said constant low rotation speed and said constant high rotation speed;
   determining values representing torque of the drum, the acceleration of the drum, the friction torque and the moment of inertia of said drum by recording during each of the phases of this rotational speed sequence at least one value of acceleration and one value of corresponding torque of this drum; and
   determining the moment of inertia of the mass of clothes in the drum from said recorded value, from the predetermined moment of inertia of the rotating drum, and from the value of the friction torque of the rotating drum in the speed up phase which is estimated as an arithmetic average of the friction torques in the constant low speed and constant high speed phases.

6. A process for determining the load of clothes in a rotating drum of one of: (a) a clothes washing and (b) a clothes drying machine, comprising the steps of:
   rotating the drum loaded with dry clothes according to a speed sequence comprising a slow speed rise phase between 0 and 100 rpm, a constant low speed phase of 100 rpm, a constant high acceleration speed rise phase between 100 rpm and 500 to 800 rpm and a constant high speed phase of 500 to 800 rpm using a motor whose drive torque is substantially proportional to the current supplied to this motor;
   determining values representing torque of the drum, the acceleration of the drum, the friction torque and the moment of inertia of said drum;
   determining the moment of inertia of said clothes according to a predetermined formula using said values;
   recording during each of the phases of this rotational speed sequence data reflecting the current supplied to this motor and data reflecting the acceleration of the drum; and
   determining the moment of inertia of the mass of clothes in the drum from said recorded data, from the predetermined moment of inertia of the empty drum, and from the value of the friction torque of the rotating drum in the high acceleration speed rise phase, which is estimated at the arithmetic average of the friction torques in the constant low speed and constant high speed phases.

7. A process as in claim 4, wherein said moment of inertia is determined according to the relation $$L = \frac{1}{\frac{dw}{dt}} \left( C_e - J_o \frac{dw}{dt} - C_{Fa} \right)$$

where
- $C_e$ is the drive torque of the drums,
- $C_f$ is the friction torque of the drum,
- $L$ is the moment of the inertia of the mass of clothes,
- $J_o$ is the moment of inertia of the rotating drum,
- $w$ is the speed of rotation of the drum;
- $dw/2$, is the acceleration, and
- $C_{Fa}$ is estimated approximately as an arithmetic average of the friction torques of the drum in these constant low speed ($C_{fb}$) and constant high speed ($C_{fh}$) phases according to the formula:

$$C_{fa} = \frac{C_{fb} + C_{fh}}{2}$$

* * * * *